United States Patent
Ahrens et al.

(10) Patent No.: US 6,792,185 B1
(45) Date of Patent: Sep. 14, 2004

(54) METHOD AND APPARATUS FOR AUTOMATIC TRACKING OF AN OPTICAL SIGNAL IN A WIRELESS OPTICAL COMMUNICATION SYSTEM

(75) Inventors: Robert George Ahrens, Chatham, NJ (US); Herman Melvin Presby, Highland Park, NJ (US); Gerald E. Tourgee, Convent Station, NJ (US); John Anthony Tyson, Pottersville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/516,268

(22) Filed: Feb. 29, 2000

(51) Int. Cl.[7] .............................. G02B 6/04; G02B 6/26
(52) U.S. Cl. ......................... 385/115; 385/52; 356/400
(58) Field of Search ........................... 385/115–121, 94, 385/64, 97, 134, 52; 354/109; 356/153, 141.5, 399, 400, 614–616, 622, 624, 222, 229, 232; 398/122, 123, 128–131, 100

(56) References Cited

U.S. PATENT DOCUMENTS

| | | | | |
|---|---|---|---|---|
| 3,749,924 A | * | 7/1973 | Vischulis ................ 250/227.11 |
| 3,781,546 A | * | 12/1973 | Christian et al. ......... 250/201.1 |
| 4,071,754 A | * | 1/1978 | Roulund ................ 250/227.28 |
| 4,090,067 A | | 5/1978 | Bell, III et al. ............. 250/199 |
| 4,188,087 A | * | 2/1980 | D'Auria et al. ............... 385/78 |
| 4,678,328 A | * | 7/1987 | Craig et al. .............. 356/141.5 |
| 4,696,062 A | * | 9/1987 | LaBudde ..................... 398/156 |
| 4,721,359 A | * | 1/1988 | Nishioka et al. ............ 385/117 |
| 4,722,587 A | * | 2/1988 | Thorsten ...................... 385/76 |
| 5,005,979 A | * | 4/1991 | Sontag et al. ................ 356/622 |
| 5,103,082 A | * | 4/1992 | Fonneland et al. ....... 250/201.1 |
| 5,142,400 A | | 8/1992 | Solinsky ...................... 359/159 |
| 5,299,560 A | * | 4/1994 | Hatori ......................... 600/121 |
| 5,461,476 A | * | 10/1995 | Fournier ....................... 424/65 |
| 5,559,915 A | * | 9/1996 | Deveau ........................ 385/49 |
| 5,864,643 A | * | 1/1999 | Pan ............................. 385/22 |
| 5,946,099 A | * | 8/1999 | Ota et al. .................... 356/614 |
| 6,005,998 A | * | 12/1999 | Lee .............................. 385/33 |
| 6,031,947 A | * | 2/2000 | Laor ........................... 385/22 |
| 6,239,888 B1 | | 5/2001 | Willebrand ................. 359/118 |
| 6,556,751 B1 | * | 4/2003 | Lee et al. ..................... 385/50 |

* cited by examiner

Primary Examiner—John D. Lee

(57) ABSTRACT

A method and apparatus are disclosed for aligning and maintaining the alignment of the transmitting unit and the receiving unit in an optical wireless communication system. The receiving unit includes an optical bundle positioned at the focal point of an objective optic element. The optical bundle is comprised of an array of optical fibers, arranged surrounding the receiving fiber. The receiving unit also includes a number of detectors that measure the optical signal strength on a corresponding fiber in the optical bundle. The array of fibers is used to detect the location of the received signal relative to the receiving optical fiber and to provide feedback to adjust the orientation of the optical bundle to optimize the received signal strength. When misalignment occurs between the received signal and the receiving fiber, some of the incident received signal will be captured by one or more of the outer optical fibers. The amplitude of each of the generated signals are then compared to each other, thereby giving a direction in which to drive the optical bundle back into alignment with the received signal. The present invention provides automatic tracking using the information-carrying optical signal, without the need for a separate laser.

20 Claims, 4 Drawing Sheets

METHOD AND APPARATUS FOR AUTOMATIC TRACKING OF AN OPTICAL SIGNAL IN A WIRELESS OPTICAL COMMUNICATION SYSTEM

FIELD OF THE INVENTION

The invention is directed toward the field of free-space optical communications, and more particularly, to a method and apparatus for automatically aligning the transmitter and receiver in a free-space optical communication system.

BACKGROUND OF THE INVENTION

In wireless optical communication systems, the optical signal propagates in free space. In contrast to radio frequency (RF) communication systems, optical wireless communication systems are extremely directional. Thus, precise alignment is required between the transmitting unit and the receiving unit. The highly directional nature of wireless optical communication systems, however, provides the advantage of improved security, since the optical signal can only be intercepted along the path of the transmitted light. Another advantage of the optical wireless link is that the optical portion of the spectrum is not regulated by the government. Thus, a government license is not required to operate the transmitter and receiver, unlike a comparable radio frequency wireless communication system. More importantly, the bandwidth or information carrying capacity of optical wireless systems is much greater than that of RF wireless communication systems.

Fiber-based communication systems require the use of an optical fiber. Wireless optical communication systems have an advantage over such fiber-based communication systems in that the wireless communication systems do not require a physical connection between the transmitter and the receiver. In an urban environment, such as New York City, it can be difficult to install a physical connection between two buildings, especially if the buildings are separated by a street or another building. A wireless optical link only requires an unobstructed path between the transmitter and the receiver, which is often easier to achieve in an urban environment than a physical link. Wireless optical communication systems are particularly suitable for use where temporary high capacity data links between two installations are required, such as in an emergency relief operation for a disaster area or in military operations.

Wireless optical systems include a transmitting unit, for forming a transmitted beam, aimed at a receiving unit that collects the received beam. Typically, the optical signal to be transmitted is emitted from a semiconductor laser. The emitting facet of the laser (or an optical fiber into which the laser is coupled) lies at the front focal plane of the transmitting unit. The received signal is typically collected on a photodetector (or an optical fiber connected to the photodetector) positioned at the rear focal plane of the receiving unit.

As previously indicated, optical signals are extremely directional. Thus, the transmitting unit and the receiving unit must be precisely aligned with one another. Nonetheless, atmospheric diffraction effects can cause the transmitted beam to deviate from the carefully aimed path (beam wander). In addition, the alignment can be degraded as a result of temperature variations or movement of the transmitting unit or the receiving unit, for example, when the structure upon which the transmitting unit or the receiving unit is mounted moves.

Automatic beam tracking techniques have been used to compensate for alignment degradation and to ensure alignment of the transmitting unit and the receiving unit. Conventional automatic tracking techniques typically utilize a beacon signal that is generated by a separate laser using a different wavelength than the primary information-carrying signal. The beacon signal, which is aligned with the main beam, travels along the optical path and is redirected to dedicated alignment hardware, including a video camera. The dedicated alignment hardware determines whether the beacon signal (and thus, the primary information-carrying signal) is out of alignment and determines an appropriate alignment correction, if necessary, in a well-known manner. In addition to the added expense from such dedicated hardware, the beacon signal may exhibit different transmission properties, since the beacon signal is transmitted at a different wavelength than the primary information-carrying signal.

A need therefore exists for an automatic tracking technique that aligns the transmitting unit and the receiving unit using the primary information-carrying optical signal itself. A further need exists for an automatic tracking technique that aligns the transmitting unit and the receiving unit using the same wavelength as the primary information-carrying signal.

SUMMARY OF THE INVENTION

Generally, a method and apparatus are disclosed for aligning the transmitting unit and the receiving unit in an optical wireless communication system. The receiving unit includes an objective optic, such as a lens, and an optical bundle positioned at the focal point of the lens. According to one aspect of the present invention, the optical bundle is comprised of an array of optical fibers, arranged surrounding the receiving fiber. The receiving unit also includes a number of detectors that measure the optical signal strength on a corresponding fiber in the optical bundle. The array of fibers is used to detect the location of the received signal relative to the receiving optical fiber and to provide feedback to adjust the orientation of the optical bundle to optimize the received signal strength.

An alignment process utilizes the optical signal strengths measured by the surrounding fibers in the array to detect the location of the received signal relative to the receiving optical fiber, and to provide feedback to adjust the orientation of the receiving unit to optimize the received signal strength. Each outer optical fiber is connected to a corresponding optical signal detector that generates error signals that are proportional to the degree of misalignment between the receive signal and the receiving fiber. When misalignment occurs between the received signal and the receiving fiber, some of the incident received signal will be captured by one or more of the outer optical fibers. The amplitude of each of the generated signals are then compared to each other, thereby giving a direction in which to drive the optical bundle back into alignment with the received signal.

The present invention provides automatic tracking using the information-carrying optical signal, without the need for a separate laser. In one embodiment, the fibers in the array and the receiving fiber terminate in the same plane. In further variations, the receiving fiber is recessed relative to the surrounding fibers to prevent the optical signal from terminating in the cladding of the receiving fiber as the receiving unit initially loses alignment. The receiving fiber can be recessed relative to the surrounding fibers, for example, by appending an extension bundle or a silica disk to the optical bundle to add additional length to each fiber in the array.

A more complete understanding of the present invention, as well as further features and advantages of the present invention, will be obtained by reference to the following detailed description and drawings.

DETAILED DESCRIPTION

Figure 1:
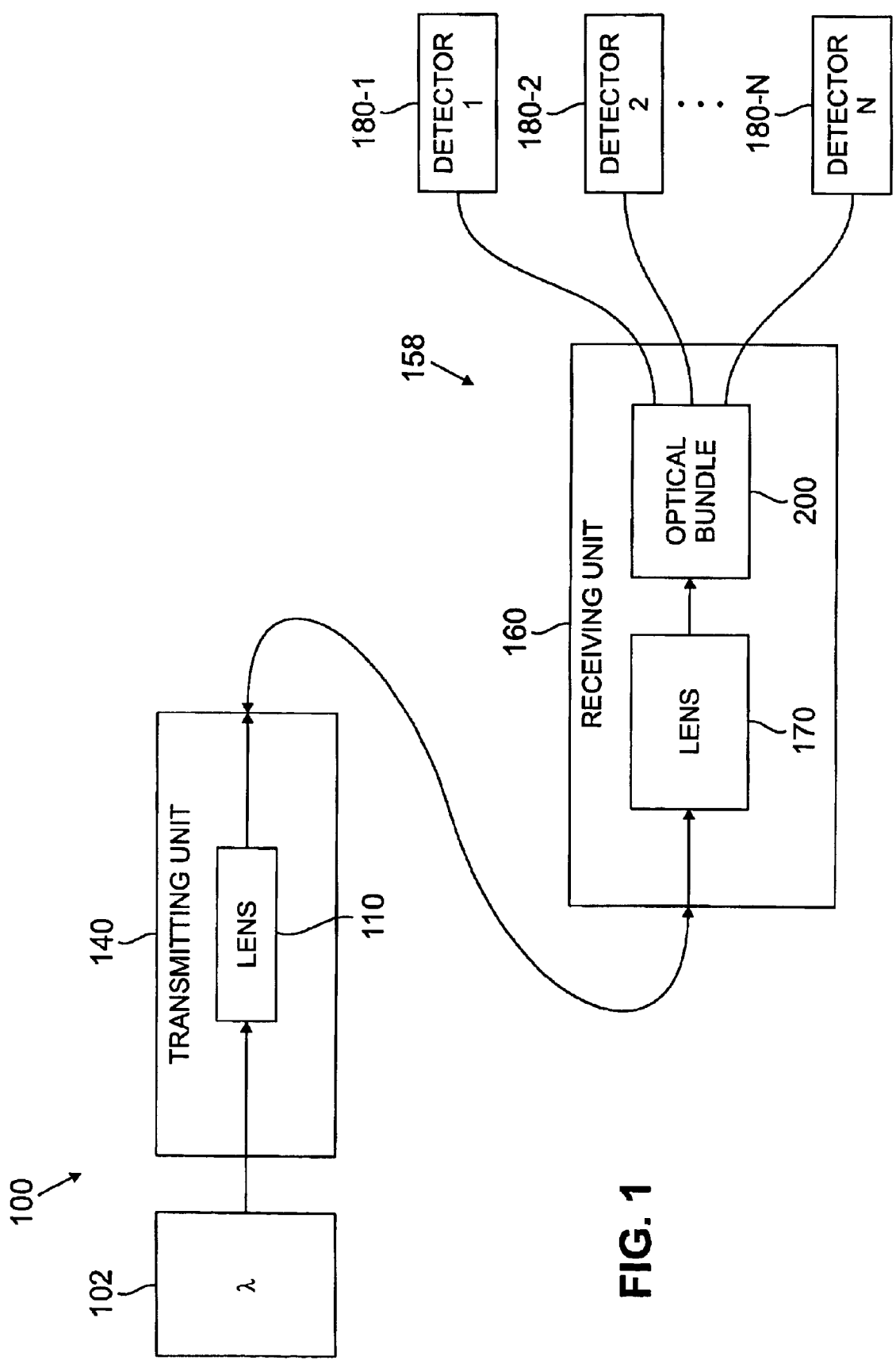
FIG. 1 is a block diagram of a suitable wireless optical communication system in which the present invention can operate.

FIG. 1 is a block diagram of an illustrative wireless optical communication system in which the present invention can operate. The wireless optical communication system includes an optical transmitting unit 100 and an optical receiving unit 158. In the illustrative embodiment, the optical transmitting unit 100 includes a source 102 of light at a given wavelength. It is noted, however, that the present invention could also be implemented in an optical communication system that utilizes multiple wavelengths, as would be apparent to a person of ordinary skill in the art.

The illustrative source 102 may be embodied, for example, as a distributed feedback (DFB) laser that operates, for example, in a range of light between 1300 and 1700 nanometers (nm). The light generated by the source 102 is captured by an objective optic, such as a lens 110, of a transmitting unit 140.

As shown in FIG. 1, the receiver 158 includes a receiving unit 160 having an objective optic, such as a lens 170, and an optical bundle design 200 in accordance with the present invention. The optical bundle 200, discussed further below in conjunction with FIGS. 2 through 5, is positioned at the focal point of the lens 160. As discussed further below in conjunction with FIG. 6, the receiving unit 158 also includes a number of detectors 180-1 through 180-N, hereinafter collectively referred to as detectors 180, that measure the optical signal strength on a corresponding fiber in the bundle 200. As previously indicated, the transmitting unit 140 and the receiving unit 160 must be precisely aligned due to the directional nature of optical signals. The optical path between the transmitting unit 140 and the receiving unit 160 is indicated by reference number 150.

Figure 2:
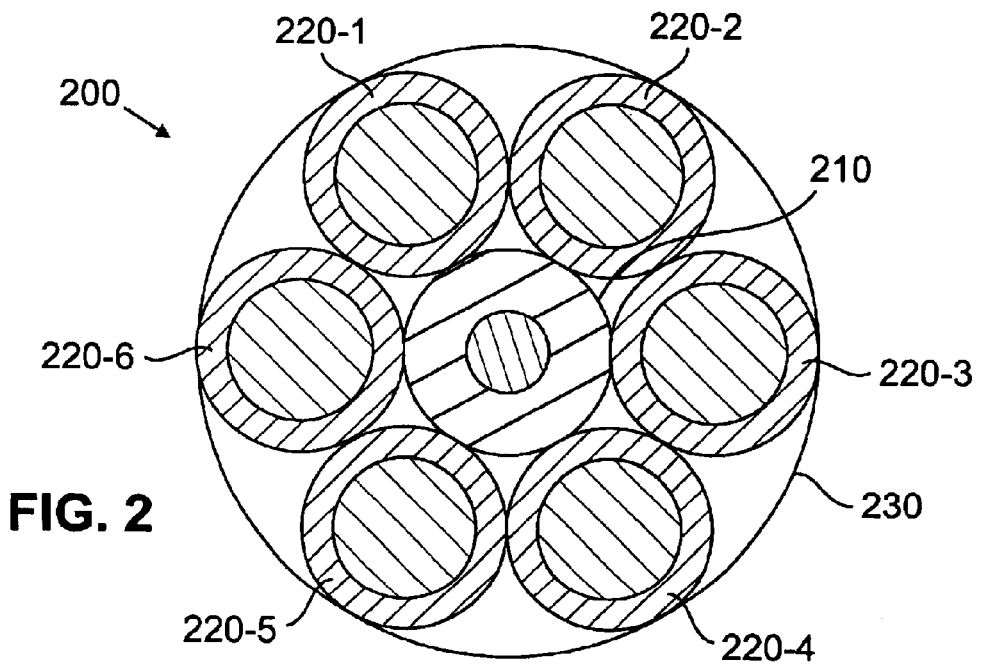
FIG. 2 illustrates an end view of an optical bundle design in accordance with the present invention for use with the receiving unit of FIG. 1.

FIG. 2 illustrates an end view of an optical bundle design 200 for use with the receiving unit 160 in accordance with the present invention. As shown in FIG. 2, the optical bundle design 200 is comprised of an array 220 of optical fibers 220-1 through 220-N, arranged in the plane surrounding the receiving fiber 210. As discussed hereinafter, the array 220 is used to detect the location of the received signal relative to the receiving optical fiber 210 and used to provide feedback to adjust the orientation of the receiving unit 160 to optimize the received signal strength, as discussed further below in conjunction with FIG. 6. In this manner, the surrounding fibers 220 detect whether the signal in the received fiber 210 is properly aligned.

According to one feature of the present invention, automatic tracking is provided using the same wavelength, and in fact, the same information-carrying optical signal, without the need for a separate laser. The number, N, of optical fibers 220-N in the surrounding array 220 is selected to simplify fabrication. It has been found, for example, that symmetry is hard to achieve for four (4) fibers, and that six (6) fibers automatically provides the desired symmetry for equal fiber diameters. The core diameter and numerical aperture of the optical fibers 220-N in the surrounding array 220 are selected to capture as much light as possible. In the illustrative embodiment shown in FIG. 2, the array 220 includes six (6) optical fibers 220-1 through 220-6.

It is noted that receiving fibers 210 typically have a core diameter on the order of 50 microns. The diameter of the received fiber 210 is selected to balance the core diameter with the resultant pulse dispersion. Generally, as the core diameter increases, the pulse dispersion also increases. Thus, the pulse dispersion imposes a limit on the amount of information that may be transmitted on a multi-mode fiber. The optical fibers 220-N in the illustrative surrounding array 220 are used to obtain a measurement of the amount of light captured by each fiber 220-N relative to other fibers in the array 220 and to the receiving fiber 210 (and not to detect data in the optical signal). Thus, pulse dispersion is not an issue for the fibers in the array 220 and the surrounding fibers 220-N can have a core diameter on the order of 100 microns, in order to maximize the amount of captured light.

It is noted that the fibers 220-N in the array 220 and the receiving fiber 210 all terminate in the same plane in the embodiment of FIG. 2. It has been observed, however, that as the transmitting unit 140 and the receiving unit 160 initially lose alignment, the beam deviation will position portions of the optical signal in the cladding of the receiving fiber 210 (which cannot be detected). One possibility that reduces but does not eliminate this problem is to reduce the thickness of the cladding (which may require additional post-fabrication processing of a fiber). Thus, according to additional features of the present invention, discussed in conjunction with FIGS. 3 through 5, the sensitivity of the automatic tracking system is increased.

Figure 3:
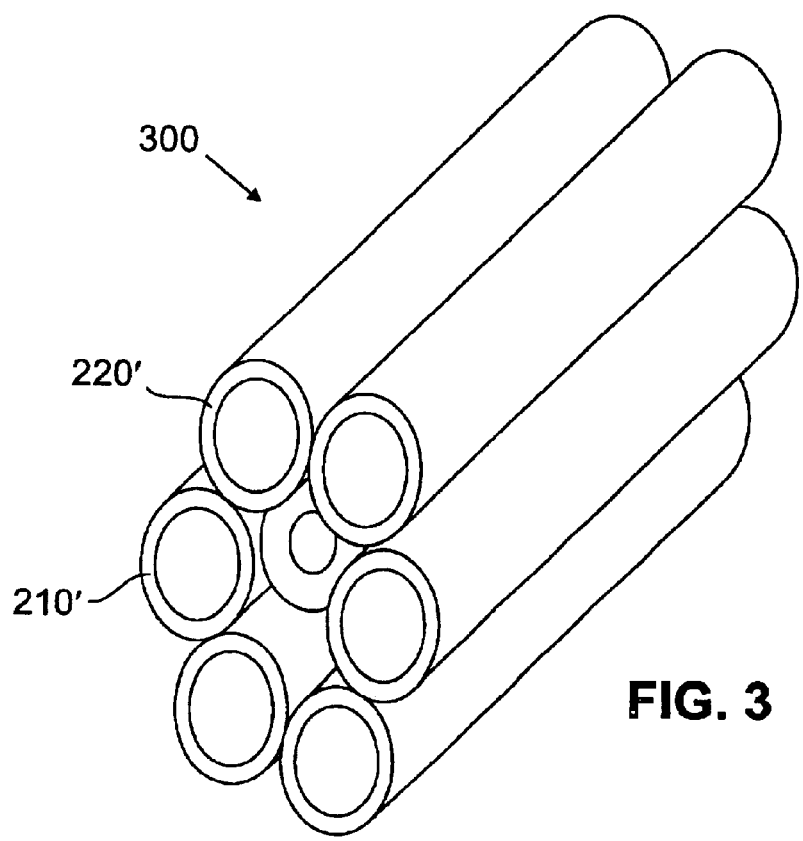
FIG. 3 illustrates a second embodiment of the optical bundle design of the present invention.

FIG. 3 illustrates a second embodiment of an optical bundle design 300 in accordance with the present invention. In the embodiment of FIG. 3, the array 220' of optical fibers is arranged around the receiving fiber 210', with the receiving fiber 210' recessed relative to the array 220. In this manner, the optical signal arrives focused on the core of the receiving fiber 210' and part of the optical signal will be captured by the surrounding fibers 220' (even for perfect alignment). As the optical signal deviates from perfect alignment, additional signal strength will be measured by the surrounding fibers 220'. The embodiment of FIG. 3 can be fabricated, for example, by polishing the terminal end, in a known manner, that serves to terminate all the fibers 220-N' and 210' in the same plane, and then pulling back the receiving fiber 210'.

Figure 4:
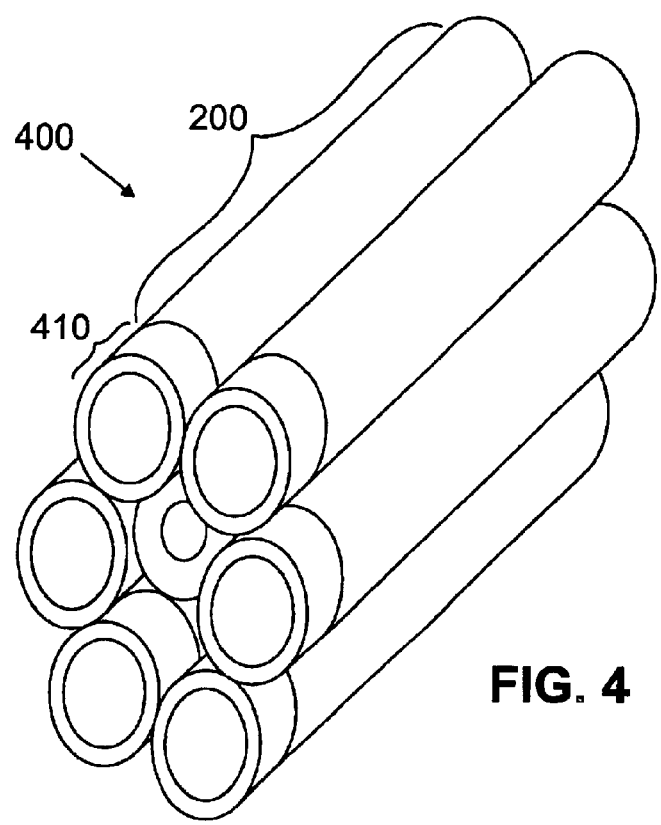
FIG. 4 illustrates a third embodiment of the optical bundle design of the present invention.

FIG. 4 illustrates a third embodiment of an optical bundle design 400 in accordance with the present invention. In the embodiment of FIG. 4, an extension bundle 410 is added to the optical bundle design 200 of FIG. 2 to add additional length, L, to each surrounding fiber. The embodiment of FIG. 4 can be fabricated, for example, by utilizing an extension bundle 410 of length L comprised of six optical fibers arranged around a central fiber. The central fiber is then removed from the extension bundle 410, to create an array of six surrounding fibers of length L that may be appended to the embodiment 200 shown in FIG. 2, for increased sensitivity.

Figure 5:
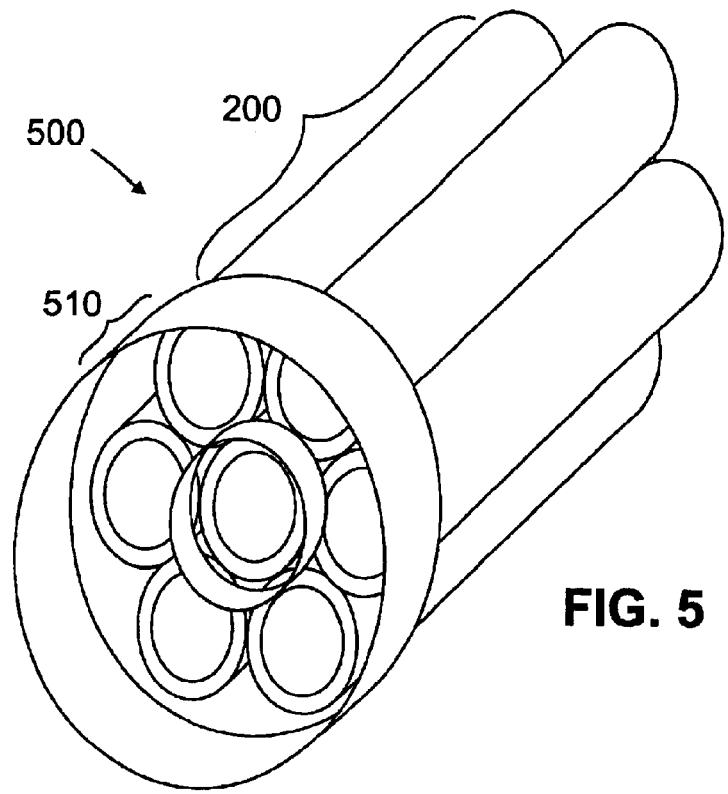
FIG. 5 illustrates a fourth embodiment of the optical bundle design of the present invention.

FIG. 5 illustrates a fourth embodiment of an optical bundle design 500 in accordance with the present invention. In the embodiment of FIG. 5, a silica disk 510 is appended to the optical bundle design 200 of FIG. 2 to add additional length, L, to each surrounding fiber. The embodiment of FIG. 5 can be fabricated, for example, by utilizing a silica disk 510 having a hole in the center. The outer diameter of the disk 510 is at least equal to the diameter of the optical bundle design 200 of FIG. 2 and the inner diameter of the disk is approximately equal to the core diameter of the receiving fiber 210. In this manner, portions of the optical signal that travel through the disk 510 will be refracted into the surrounding fibers 220-N of the optical bundle design 200. Likewise, portions of the optical signal that travel through the aperture in the disk 510 will have a direct path to the core of the receiving fiber 210 of the optical bundle design 200 (without refraction).

Figure 6:
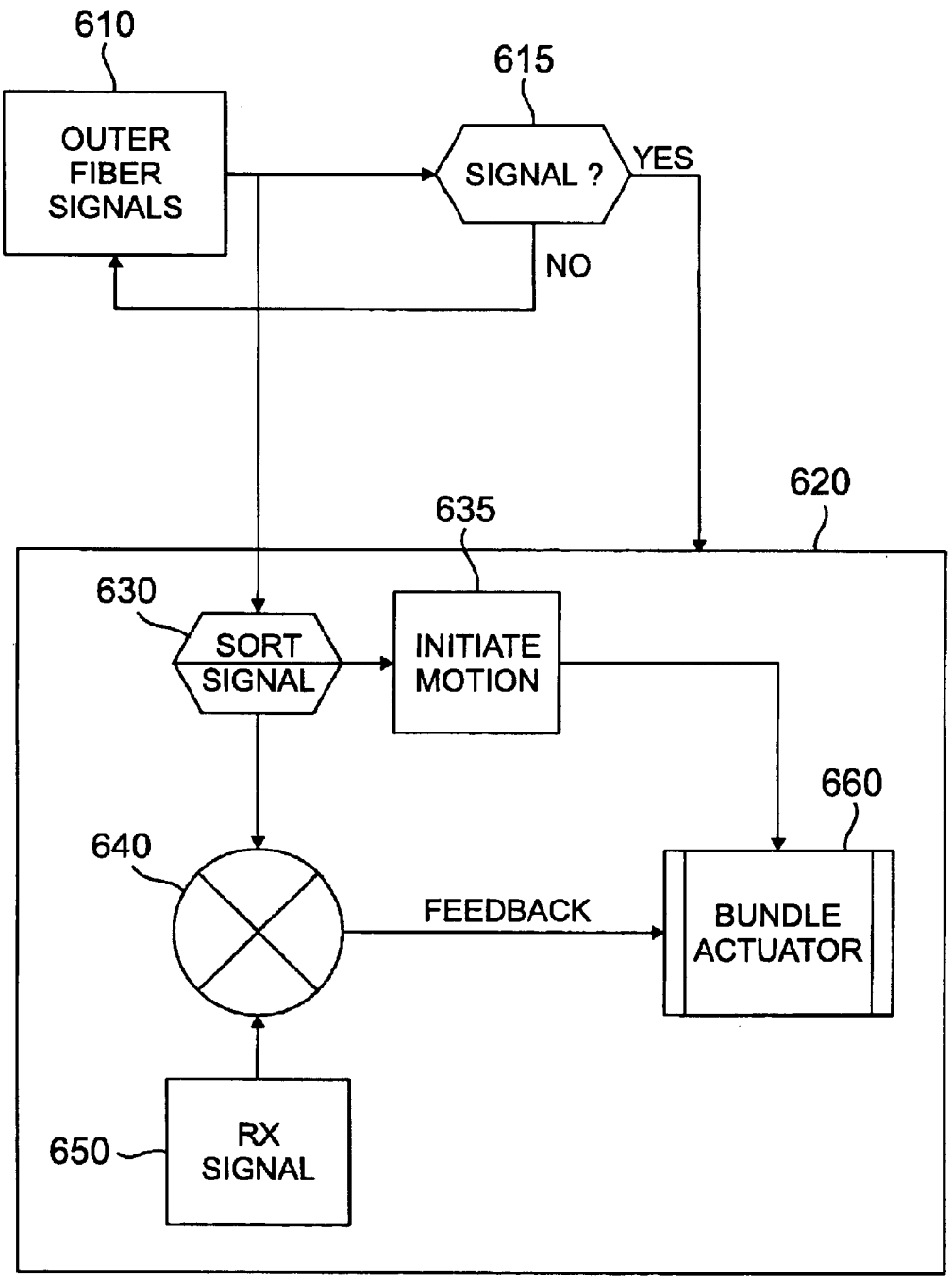
FIG. 6 is a flow chart describing an alignment process incorporating features of the present invention to detect the location of the received optical signal and to provide feedback to adjust the orientation of the receiving unit of FIG. 1.

FIG. 6 is a flow chart describing an alignment process 600 in accordance with the present invention that utilizes the optical signal strengths measured by the surrounding fibers 220-N in the array 220 to detect the location of the received signal relative to the receiving optical fiber 210, and to provide feedback to adjust the orientation of the receiving unit 160 to optimize the received signal strength.

The optical signals captured by each of the outer fibers in the optical bundle are used to determine any misalignment between the received signal and the receiving fiber. As shown in FIG. 1, each of the outer optical fibers 220 is connected to an independent optical signal detector 180 and these signals provide the error signals that are proportional to the degree of misalignment between the receive signal and the receiving fiber.

When misalignment occurs between the received signal and the receiving fiber 210, some of the incident received signal will be captured by one or more of the outer optical fibers 220. The corresponding optical signal detector(s) 180 then detects this signal, where its amplitude is measured. The amplitude of each of the generated signals are then compared to each other, thereby giving a direction in which to drive the optical bundle 200 back into alignment with the received signal. In other words, if a signal is only generated in the outer fiber 220 directly above the receiving fiber 210, then this implies that the entire bundle must be moved in the positive vertical direction in order to achieve alignment. If a signal is generated in two or more outer fibers 220, then the entire bundle 200 must be driven in the direction that will minimize the outer fiber signals, while maximizing the received fiber signal. In this case, the bundle is driven equally towards each of the two outer fibers 220 capturing a signal.

Once an optical signal is detected in one or more of the outer fibers 220, the realignment sequence 600, shown in FIG. 6, begins, thereby maximizing the received fiber signal. During this procedure, the outer fiber signals, along with the received fiber signal, are continuously monitored while the bundle 200 is moved, thereby providing feedback to the alignment algorithm 600. As the bundle 200 is moved towards realignment, the signal in the outer fibers 220 will decrease to a minimum while the signal in the receiving fiber 210 will achieve a maximum. Alignment occurs when the signals captured by the outer fibers 220 are minimized. A schematic flow chart detailing this constant feedback system is shown in FIG. 6.

As shown in FIG. 6, the signal strength in each of the outer fibers 220 is measured during step 610. A test is continuously performed during step 615 until a signal is detected in at least one of the outer fibers 220. Once a signal is detected in at least one of the outer fibers 220 during step 615, an alignment routine 620 is executed. Based on the relative strength of the signals in each of the outer fibers 220, as detected during stage 630, the bundle 200 is repositioned during stage 635 using bundle actuator 660 in a direction that drives the optical bundle 200 back into alignment with the received signal. Meanwhile, stage 640 continues to monitor the signals in each of the outer fibers 220 and receiving fiber 210 and applies a feedback signal to the actuator 660 that attempts to minimize the signal strength measured in the outer fibers 220, while maximizing the signal in the receiving fiber 210.

It is to be understood that the embodiments and variations shown and described herein are merely illustrative of the principles of this invention and that various modifications may be implemented by those skilled in the art without departing from the scope and spirit of the invention.

We claim:

1. An optical receiving unit for a wireless communications link, said optical receiving unit comprising:
    a receiving unit including at least one objective optic element; and
    an optical bundle operable to receive an optical communication signal, wherein said optical bundle is comprised of an array of optical fibers arranged surrounding a receiving fiber, wherein an intensity of said optical communication signal received by said receiving fiber relative to an intensity of said optical communication signal received by said array of optical fibers is used to adjust an orientation of said receiving unit.

2. The optical receiving unit of claim 1, wherein said array is comprised of N fibers and wherein N is selected to facilitate fabrication of said optical bundle.

3. The optical receiving unit of claim 1, wherein a core diameter and numerical aperture of said array of optical fibers are selected to capture as much light as possible.

4. The optical receiving unit of claim 1, wherein said receiving fiber is recessed relative to said array.

5. The optical receiving unit of claim 4, wherein said receiving fiber is recessed relative to said array by appending an extension bundle to said optical bundle to add additional length to each of said fibers in said array.

6. The optical receiving unit of claim 5, wherein said extension bundle is comprised of an array of fibers arranged around a central fiber and said central fiber is then removed from the extension bundle.

7. The optical receiving unit of claim 4, wherein said receiving fiber is recessed relative to said array by appending a silica disk to said optical bundle.

8. The optical receiving unit of claim 7, wherein said silica disk has a hole in the center and wherein an outer diameter of said silica disk is at least equal to the diameter of said optical bundle and an inner diameter of said silica disk is approximately equal to the core diameter of said receiving fiber.

9. An optical receiving unit for a wireless communications link, said optical receiving unit comprising:
    a receiving unit including at least one objective optic element; and
    an optical bundle operable to receive an optical signal, wherein said optical bundle is comprised of an array of optical fibers arranged surrounding a receiving fiber, wherein said array of optical fibers detects a location of said signal relative to said receiving fiber and provides feedback to adjust an orientation of said receiving unit based on an intensity of said optical communication signal received by said receiving fiber relative to an intensity of said optical communication signal received by said array of optical fibers.

10. The optical receiving unit of claim 9, wherein said array is comprised of N fibers and wherein N is selected to facilitate fabrication of said optical bundle.

11. The optical receiving unit of claim 9, wherein a core diameter and numerical aperture of said array of optical fibers are selected to capture as much light as possible.

12. The optical receiving unit of claim 9, wherein said receiving fiber is recessed relative to said array.

13. The optical receiving unit of claim 12, wherein said receiving fiber is recessed relative to said array by appending an extension bundle to said optical bundle to add additional length to each of said fibers in said array.

14. The optical receiving unit of claim 13, wherein said extension bundle is comprised of an array of fibers arranged around a central fiber and said central fiber is then removed from the extension bundle.

15. The optical receiving unit of claim 12, wherein said receiving fiber is recessed relative to said array by appending a silica disk to said optical bundle.

16. The optical receiving unit of claim 15, wherein said silica disk has a hole in the center and wherein an outer diameter of said silica disk is at least equal to the diameter of said optical bundle and an inner diameter of said silica disk is approximately equal to the core diameter of said receiving fiber.

17. A method of aligning an optical receiving unit with an optical transmitting unit in a wireless communications link, said method comprising:

receiving an optical signal using an optical bundle comprised of an array of optical fibers arranged surrounding a receiving fiber;

measuring a signal strength of said optical signal in each fiber in said array of optical fibers and in said receiving fiber; and repositioning said optical bundle to reduce the signal strength in said fibers in said array of optical fibers and to increase the signal strength in said receiving fiber.

18. The method of claim 17, further comprising the step of recessing said receiving fiber relative to said array.

19. The method of claim 18, further comprising the step of appending an extension bundle to said optical bundle to add additional length to each of said fibers in said array.

20. The method of claim 18, further comprising the step of appending a silica disk to said bundle.

* * * * *

UNITED STATES PATENT AND TRADEMARK OFFICE
CERTIFICATE OF CORRECTION

PATENT NO. : 6,792,185 B1
DATED : September 14, 2004
INVENTOR(S) : Ahrens et al.

Page 1 of 1

It is certified that error appears in the above-identified patent and that said Letters Patent is hereby corrected as shown below:

<u>Column 8,</u>
Line 25, before "bundle" and after "said" insert -- optical --.

Signed and Sealed this

Seventh Day of February, 2006

JON W. DUDAS
*Director of the United States Patent and Trademark Office*